(12) United States Patent
Douglas et al.

(10) Patent No.: US 9,059,603 B2
(45) Date of Patent: Jun. 16, 2015

(54) SOLAR POWERED ELECTRICAL ENERGY GENERATING DEVICE

(75) Inventors: Conley George Douglas, Kingston (JM); Bryon Bruce, Kingston (JM); Robert Bruce, Kingston (JM); Edward Jon Hanna, Kingston (JM)

(73) Assignee: Sunline Jamaica Limited (JM)

( * ) Notice: Subject to any disclaimer, the term of this patent is extended or adjusted under 35 U.S.C. 154(b) by 819 days.

(21) Appl. No.: 12/332,855

(22) Filed: Dec. 11, 2008

(65) Prior Publication Data

US 2010/0148720 A1    Jun. 17, 2010

(51) Int. Cl.
*H02J 7/00* (2006.01)
*H02J 3/38* (2006.01)
*H02J 7/35* (2006.01)

(52) U.S. Cl.
CPC .............. *H02J 3/383* (2013.01); *H02J 7/0022* (2013.01); *H02J 7/35* (2013.01); *H02J 2007/0067* (2013.01); *Y02E 10/563* (2013.01); *Y02E 10/566* (2013.01)

(58) Field of Classification Search
USPC ...................................... 320/101; 363/9, 150
See application file for complete search history.

(56) References Cited

U.S. PATENT DOCUMENTS

| | | | |
|---|---|---|---|
| 3,675,037 A | 7/1972 | Hamilton | |
| 4,016,474 A | 4/1977 | Mason | |
| 4,568,869 A | 2/1986 | Graham, Jr. | |
| 4,728,806 A | 3/1988 | Baker et al. | |
| 5,175,485 A * | 12/1992 | Joo | 320/159 |
| 5,191,519 A | 3/1993 | Kawakami | |
| 5,212,630 A | 5/1993 | Yamamoto et al. | |
| 5,497,067 A | 3/1996 | Shaw | |
| 5,726,551 A * | 3/1998 | Miyazaki et al. | 320/104 |
| 5,852,554 A | 12/1998 | Yamamoto | |
| 5,956,244 A | 9/1999 | Rehm et al. | |
| 6,178,103 B1 | 1/2001 | Deng et al. | |
| 6,452,290 B1 | 9/2002 | Yoshioka et al. | |
| 6,750,391 B2 | 6/2004 | Bower et al. | |
| 6,949,843 B2 * | 9/2005 | Dubovsky | 307/64 |
| 7,072,194 B2 * | 7/2006 | Nayar et al. | 363/71 |
| 7,177,168 B2 * | 2/2007 | Toyomura et al. | 363/131 |
| 7,196,494 B2 | 3/2007 | Baumgartner | |
| 7,378,758 B2 | 5/2008 | Ling | |
| 2003/0094919 A1 * | 5/2003 | Shigemizu et al. | 318/801 |
| 2004/0192407 A1 | 9/2004 | Formenti | |

(Continued)

*Primary Examiner* — Drew A Dunn
*Assistant Examiner* — Robert Grant
(74) *Attorney, Agent, or Firm* — Mchale & Slavin P.A.

(57) ABSTRACT

A system and method for charging batteries in a system wherein the output of the batteries is converted to alternating current utilizing inverters. The alternating current from the inverters is modified by transformers and variable speed drives to contain properties which enable the alternating current to be used in a power grid to operate conventional electrical appliances. At least two banks of batteries are employed in the system. A unique battery charging device is employed to maintain the two banks batteries in constant substantially full charge. The battery charging device switches between a charge mode for one bank of batteries and a rest mode for the other bank of batteries. The battery charging device constantly and rapidly switches the different banks of batteries between these two modes. A timer controls the amount of time that each mode is applied to each bank of batteries. A solar panel supplies electric power to the charging device to charge the batteries.

12 Claims, 10 Drawing Sheets

(56) References Cited

U.S. PATENT DOCUMENTS

| | | |
|---|---|---|
| 2006/0045750 A1* | 3/2006 | Stiles .............................. 417/42 |
| 2006/0052903 A1* | 3/2006 | Bassett ......................... 700/282 |
| 2006/0120001 A1 | 6/2006 | Weber et al. |
| 2007/0007818 A1* | 1/2007 | O'Gorman et al. ............... 307/1 |
| 2007/0040539 A1 | 2/2007 | Cutler |
| 2007/0200347 A1* | 8/2007 | Sulzer ........................ 290/40 C |
| 2007/0217239 A1 | 9/2007 | Rottger et al. |
| 2008/0106921 A1 | 5/2008 | Dickerson et al. |

\* cited by examiner

IC = ne 555
R1 = 100Kpot
R2 = 10 15KΩ
R3 = 330Ω
C = 1000µ□
TR = C1226

$T_{HIGH} = T\text{-}H$ $T_{LOW} = T\text{-}L$ $T_{TOTAL} = T\text{-}H + T\text{-}L$

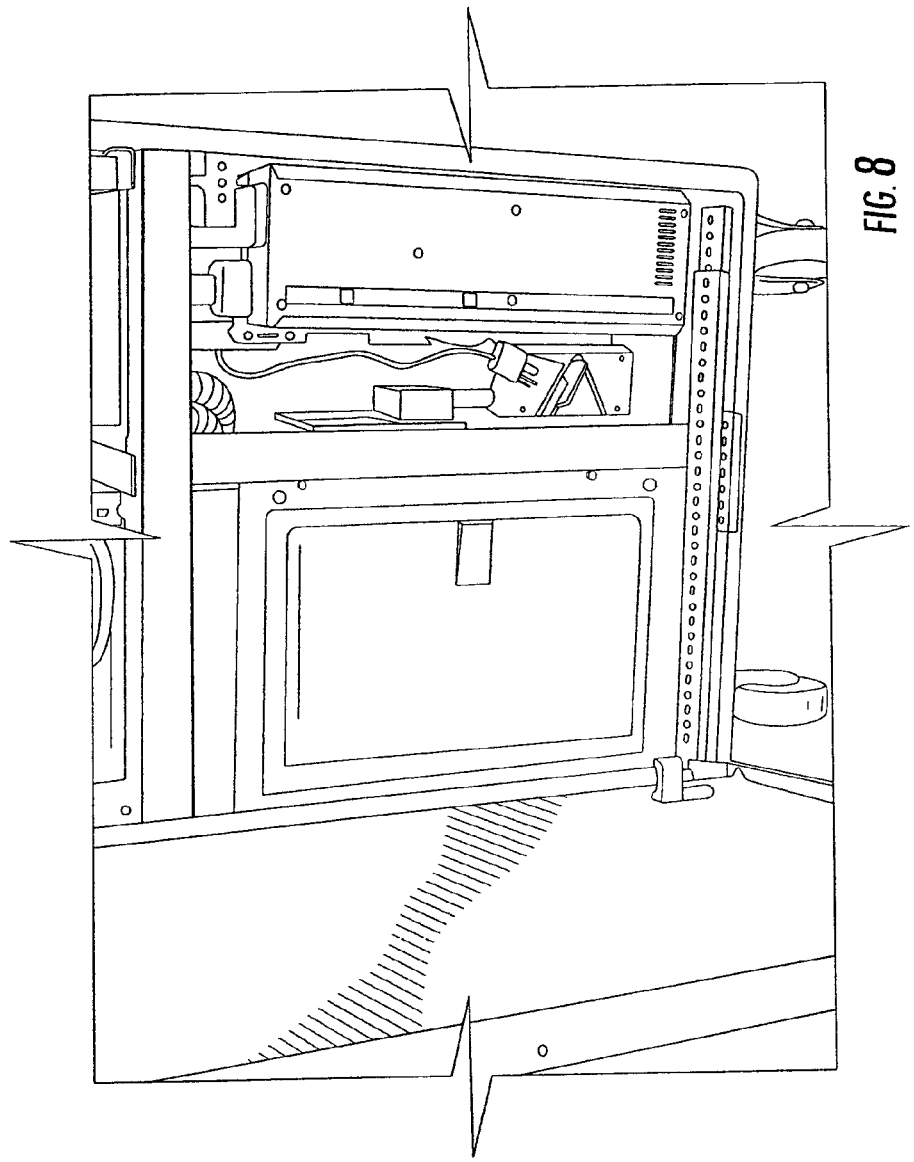

SOLAR POWERED ELECTRICAL ENERGY GENERATING DEVICE

FIELD OF THE INVENTION

The present invention is directed to a system which produces electrical power which can be utilizes to operate conventional electrical appliances. In particular the present invention is directed to a system which produces electrical power for the operation of appliances from batteries. The batteries are charges utilizing solar panels and employ a unique charging cycle.

BACKGROUND OF THE INVENTION

The provision of electric power to operate conventional electrical appliances in locations that are remote from electrical power generation stations has always been a problem. In the past small gasoline or diesel powered electrical generators have been utilized to supply electric power in areas that are remote from electrical power generation stations. One of the areas that has this problem is the numerous islands in the Caribbean ocean. These islands are too small to build conventional electrical power generation stations.

DESCRIPTION OF THE PRIOR ART

The www.solar4power.com web page discloses the basics of solar power.

U.S. Pat. No. 7,196,494 issued to Baumgartner discloses a method and apparatus for charging batteries in a system of batteries. The method and apparatus involve producing a set of state of charge signals indicative of the states of charge of each battery in the system, successively identifying, from the state of charge signals, a most discharged battery in the system and applying a charging current to the most discharged battery for at least part of a first period of time less than a period of time required to fully charge the most discharged before identifying a succeeding most discharged battery in the system. The batteries are charges according to a dynamic charging sequence in which batteries are added into the charging sequence in order of increasing state of charge as batteries already in the charging sequence are charged to exceed the state of charge of a battery having the next higher state of charge relative to the state of charge on the batteries already in the charging sequence.

U.S. Pat. No. 5,726,551, issued to Miyazaki discloses a battery charging device having a time shared charging cycle. The battery charging device is provided with a charge controlling unit which is designed to perform a rest mode operating function which causes charging to rest for respective battery groups and a discharge mode operating function which causes electric power from the respective battery groups to discharge. In addition, the battery charging unit controls charging unit controls charging for the respective battery groups through the charge controlling unit while repeating at least two of the modes including the charging mode, rest mode and discharge mode in a predetermined time cycle and further performs a mutual control between the respective battery groups so that at least one battery group is placed in the rest mode in a predetermined sequence during the operation thereof. This system is directed at eliminating the drawbacks of conventional pulse and burp charging, which are suitable for a quick charging but require a large instantaneous charging current which causes a size increase of the charging unit and the electric circuit concerned.

U.S. Pat. No. 7,378,758, issued to Ling discloses a parallel inverter system in which each inverter includes a synchronized square wave generator, a voltage given generator, a voltage regulating unit and a power amplifier unit. All of the above units are connected in parallel. The output current given by the voltage regulating unit no longer requires selection of "one out of many components," but outputs a linear combination result of outputs of all of the voltage regulating units after linear combination, thereby changing an unequal parallel connection to an equalized parallel connection. At the same time, the output square waves of all of synchronizing square wave generators are inputted into voltage given generators as the synchronizing square wave after AND. The output sine waves of all of voltage given generators after linear combination are used as given voltage of voltage regulating units.

SUMMARY OF THE INVENTION

A system and method for charging batteries in a system wherein the output of the batteries is converted to alternating current utilizing inverters. The alternating current from the inverters is modified by transformers and variable speed drives to contain properties which enable the alternating current to be used in a power grid to operate conventional electrical appliances. At least two banks of batteries are employed in the system. A unique battery charging device is employed to maintain the two banks batteries in constant substantially full charge. The battery charging device switches between a charge mode for one bank of batteries and a rest mode for the other bank of batteries. The battery charging device constantly switches the different banks of batteries between these two modes. A timer controls the amount of time that each mode is applied to each bank of batteries. A solar panel supplies electric power to the charging device to charge the batteries.

Accordingly, it is an objective of the instant invention to provide a battery charging device which includes a charge mode for a first bank of batteries and a rest mode for a second bank of batteries. The charging device switches between a charge mode for one bank of batteries and a rest mode for the other bank of batteries. The battery charging device constantly switches the different banks of batteries between these two modes.

It is a further objective of the instant invention to utilize a solar panel to supply electric power to a charging device for charging batteries.

It is yet another objective of the instant invention to provide a system which enables a plurality of 12 volt DC batteries to supply 220 volt AC current to a power grid.

It is a still further objective of the instant invention to provide a timing circuit in a charge device which controls the switching between a charge mode for one bank of batteries and a rest mode for the other bank of batteries. The battery charging device constantly switches the different banks of batteries between these two modes.

It is still a further objective of the instant invention to provide a system which converts direct current from batteries to alternating current utilizing inverters. The alternating current from the inverters is modified by transformers and variable speed drives to contain properties which enable the alternating current to be used in a power grid to operate conventional electrical appliances.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 8 is a view of the lower portion of the system illustrated in FIG. 6.

DETAILED DESCRIPTION OF THE INVENTION

Figure 1A:
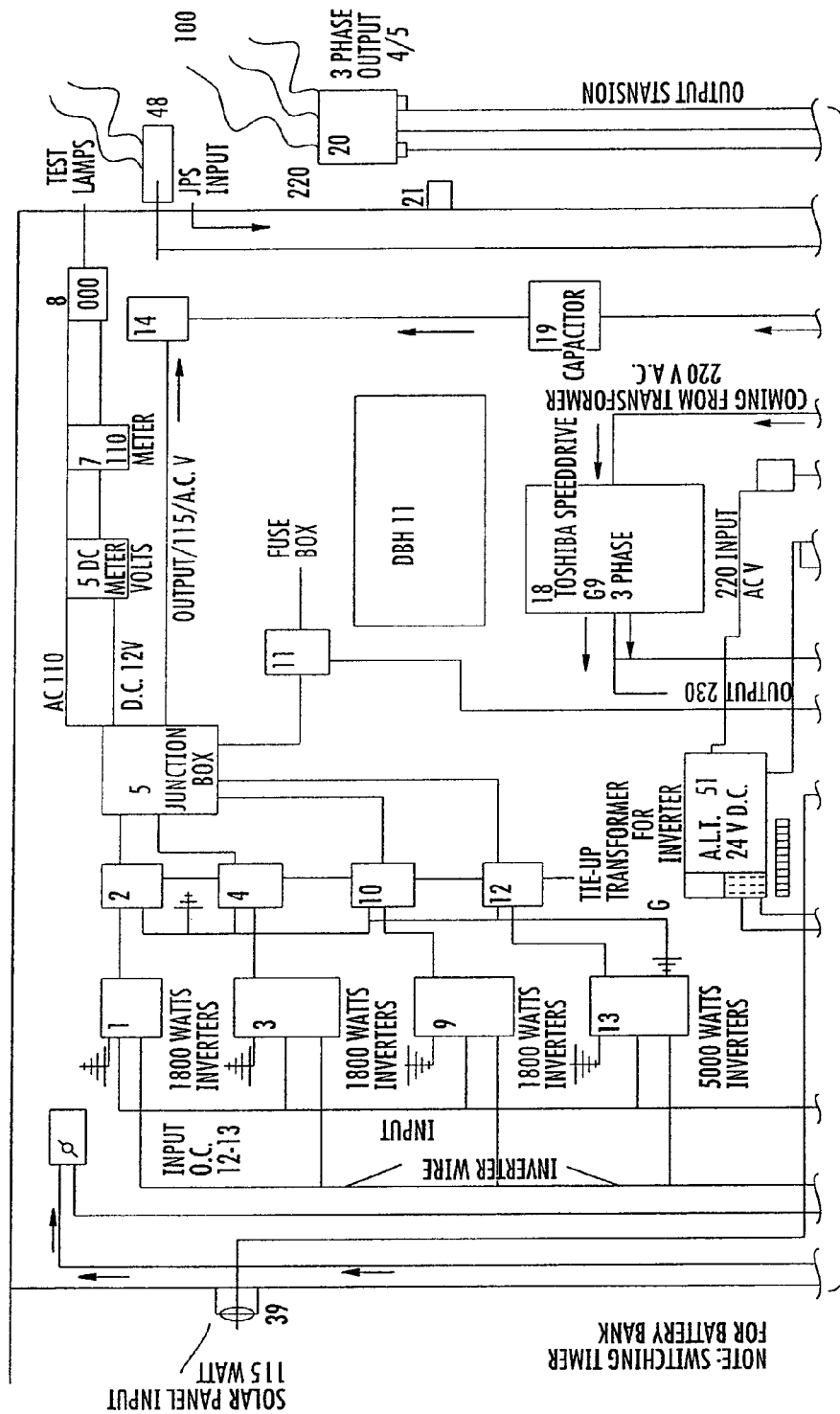
FIGS. 1A and 1B are a schematic of an embodiment of the system of the present invention including alternative electrical inputs for the battery charging device.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated. In all the drawing figures, similar elements are identified by the same reference numeral.

Whenever elements are referred to as being connected to each other in this patent application, the connection is an electrical connection. Whenever an electrical current is referred to as DC, it means direct current. Whenever an electrical current is referred to as AC, it means alternating current.

The present invention will now be described with reference to FIGS. 1-8 of the drawings. A first bank of primary batteries 30 and a second bank of primary batteries 31 are connected to a switching relay 24, 25. There can be more than two banks of batteries provided there is an even number of banks of batteries. In the preferred embodiment, the batteries are deep cycle (DL) batteries. However, other types of batteries could also be employed. The switch relay is a portion of a battery charging control. It is electrically connected between the batteries and a source of electrical power, such as a solar panel. The switch relay switches each of the at least first and second banks of batteries between a charge mode and a rest mode. In the charge mode the bank of batteries receives an electrical charge from a solar panel 39. In the illustrated embodiment the solar panel 39 has an output of 115 watts, 15 volts and 9 amps. Other solar panels and/or solar arrays can be employed which have various other electrical power outputs.

Figure 4:
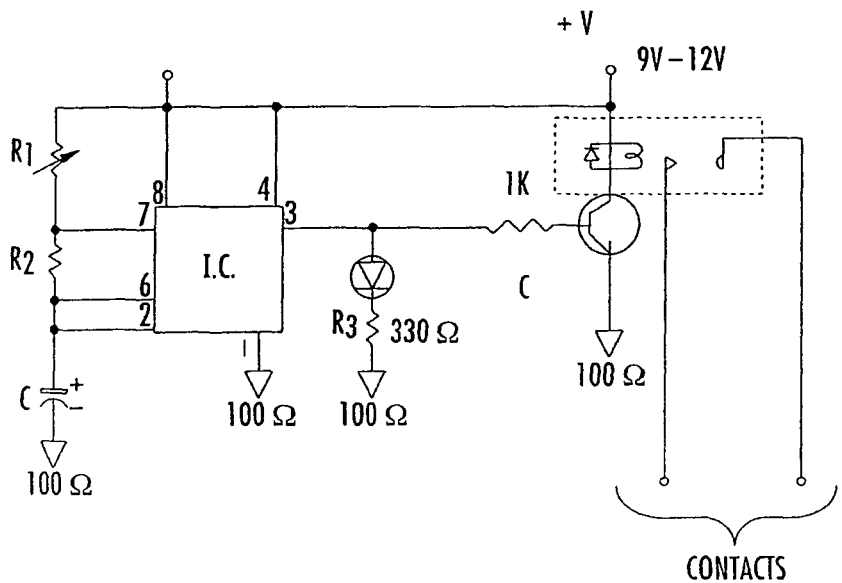
FIG. 4 is a schematic of the timer circuit which controls the switching circuit illustrated in FIG. 3.
Figure 4:
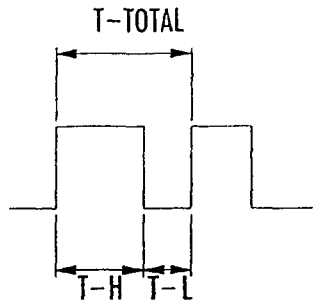

The direct current from the solar panels 39 are sent into a battery 33. From the battery 33 the direct current passes into an inverter 35. In the present embodiment the inverter 35 has a power rating of 2500 watts. The electrical output from the inverter is in the form of Alternating Current (AC) and is approximately 115 volts. This then passes into a transformer 34. The transformer 34 has an output of 13.5 volts direct current at 50 amps. The direct current from battery 34 passes through a switching relay 24, 25 to the batteries 30 and 31. A timer circuit 38 controls the switching relay 24, 25. The timer circuit is illustrated in FIG. 4 and forms another portion of the battery charging control. The timer circuit 38 controls the amount of time that the switching relay maintains a bank of batteries in a charging mode or in a rest mode. In the illustrated embodiment the charge mode and the rest mode are only a few seconds each. The length of time of each of the charge and rest mode can be varied depending on the requirements of the system. This length of time can include a fraction of a second. The length of time is controlled by an algorithm. A 12 volt DC battery 29 is connected between the timer circuit and the inverter terminals 16. In addition direct current (DC) passes from battery 33 through switch 52 and into capacitor 15. Capacitor 15, in this preferred embodiment, has a rating or size of 500 microfarads and an operating voltage of 50 volts DC. While this capacitor is illustrated as a 500 microfarad, a capacitor or capacitors of various other rating and/or sizes could be employed.

The output of the batteries 30 and 31 is connected to the inverters 1, 3, 9 and 13. Each of the inverters 1, 3, and 9 is rated at 1800 watts respectively. The inverter 13 is rated at 5000 watts. While these specific power ratings are employed in the preferred, illustrated embodiment, inverters of different power ratings could be employed depending on the requirements of the system. The outputs of the inverters 1, 3, 9 and 13 are connected to tie-up transformers 2, 4, 10 and 12 respectively. These transformers are very unique. The primary side of transformers 2, 4, 10 and 12 is connected to the inverters 1, 3, 9 and 13 with an output of 115 volts AC. The secondary side of the transformers 2, 4, 10 and 12 has an output of 12 volts DC.

The outputs of the tie-up transformers are connected to a junction box 5. One of the outputs of the junction box 5 is alternating current at 110 volts. It is connected to an AC meter 7 and test lamps 8. Another output of the junction box 5 is 12 volts DC and it is connected to a DC meter 6 and test lamps 8. A third output of the junction box is 115 volts AC. This output is connected to a capacitor 19 and then to a transformer 50. The transformer 50 increases the 115 volts AC to 220 volts AC. The 220 volt AC output of the transformer 50 is connected to a variable speed drive 18.

The variable speed drive 18 converts the single phase 220 volt AC to three phase 220 volt AC. The variable speed drive 18 also alters the frequency of the 220 volts AC to 50 hertz. In the illustrated embodiment the variable speed drive has a rating of 15 horse power, a power factor of 0.8 and an efficiency of 95%. The variable speed can control the frequency of the AC to between 1 and 60 MHz. The output of the variable speed drive is connected to a transfer switch 26. Next the AC passes through a circuit breaker box 41 which includes a 100 amp circuit breaker. The circuit breaker box 41 is connected to a junction box 28. The junction box is connected to a three phase meter box 22. The output of the three phase meter box is connected to an output connection 20 which supplies three phase 220 volt AC to a power grid 100. The power grid 100 can be any area, community, country, vessel, etc. that utilizes electrical power in the form of electrical current to operate electrical appliances and other devices which operate on electrical power.

A charger 32 has in input of 110 volts AC from JPS unit 48. The charger 32 has an output of 12 volts DC at 50 or 100 amps. This is connected to battery 31. The output of charger 32 is also connected to the battery 23 which is a 24 volt DC battery. The output of batter 23 is connected to an inverter 17 rated at 3600 watts. The inverter converts the DC to AC. The AC from the inverter 17 is connected to a fuse box 11 and then to junction box 5.

An output of switch relay 25 is connected to inverter terminals 16. Some of the terminals 16 are connected to alternator 51 which converts the 12 volts DC from the batteries 30 and 31 to 24 volts DC. The 24 volts DC are then sent to battery 23. The alternator is driven by a motor 53, shown in FIG. 2.

Another input to the system is through solar regulator 37. This regulator receives power from a solar panel or solar array and regulates or converts this power into a current which can be readily utilized in the system. A further input to the system is at 36. This input is from a bank of 12 volt DC batteries.

Figure 1B:
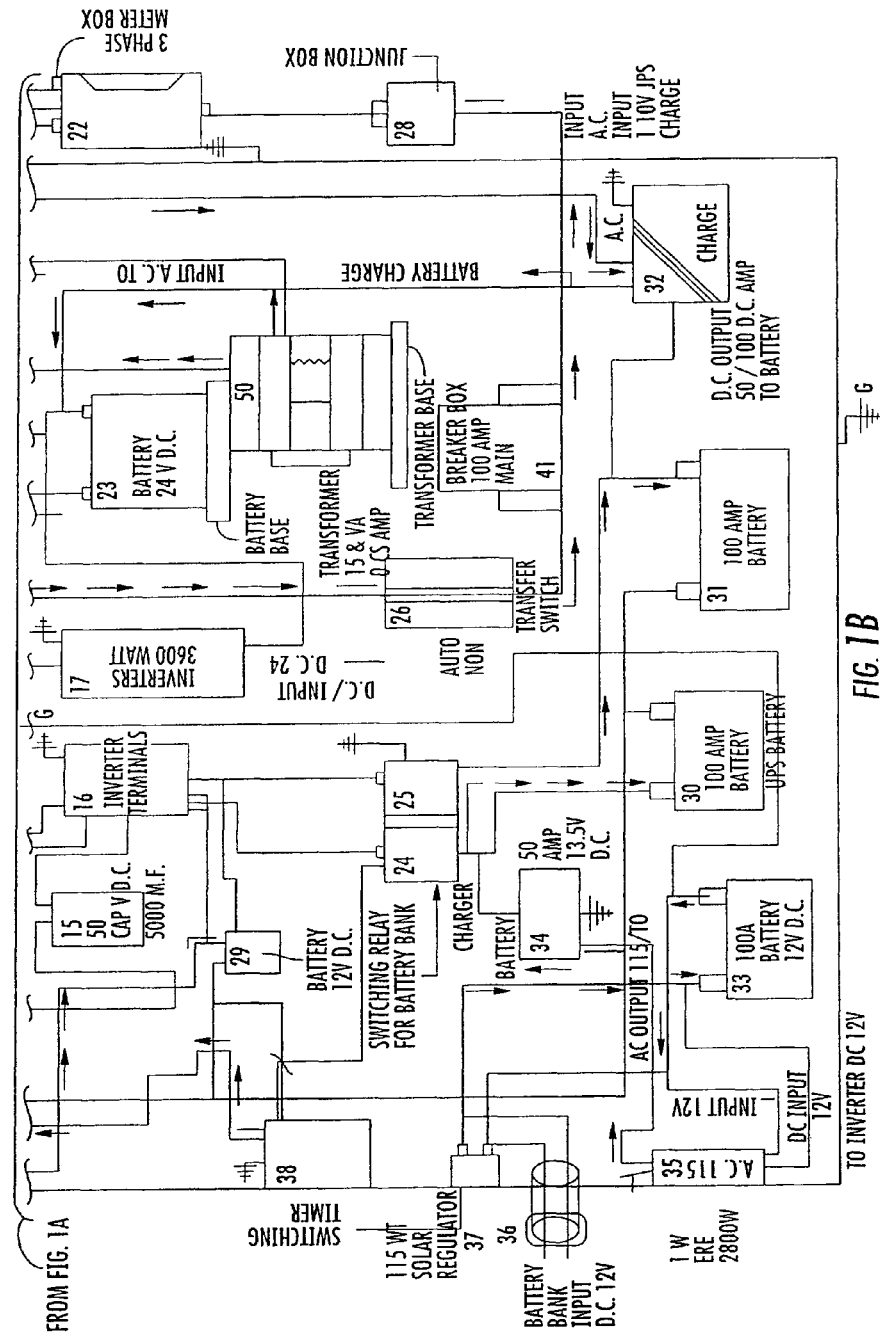
Figure 2:
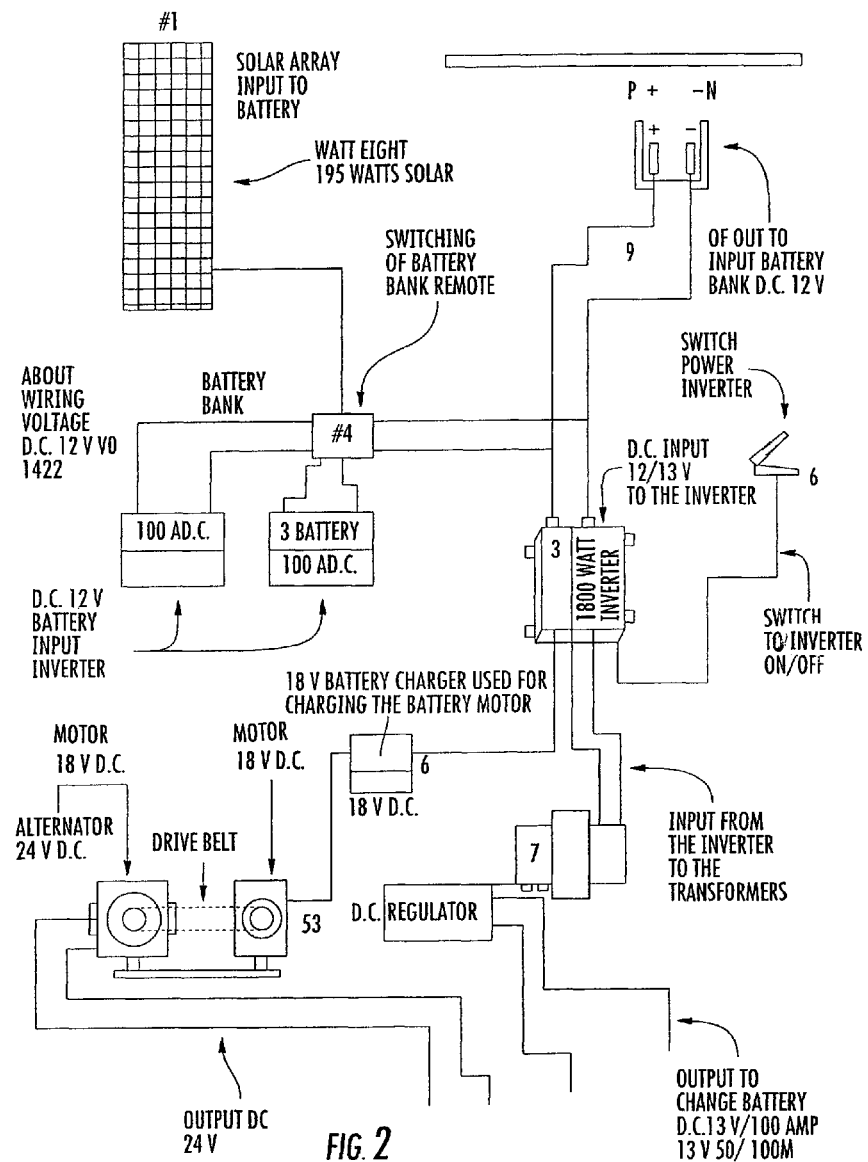
FIG. 2 is a schematic of a portion of the system of the present invention illustrated in FIG. 1 including a solar panel for inputting electrical power to the charging device, inverters to convert the direct current from the batteries to alternating current and an alternator to increase the voltage of the direct current.

FIG. 2 is a schematic which illustrates a portion of the electrical power system of FIGS. 1A and 1B including the bank of batteries, the inverters, the alternator, the motor which operates the alternator and the solar array.

Figure 3:
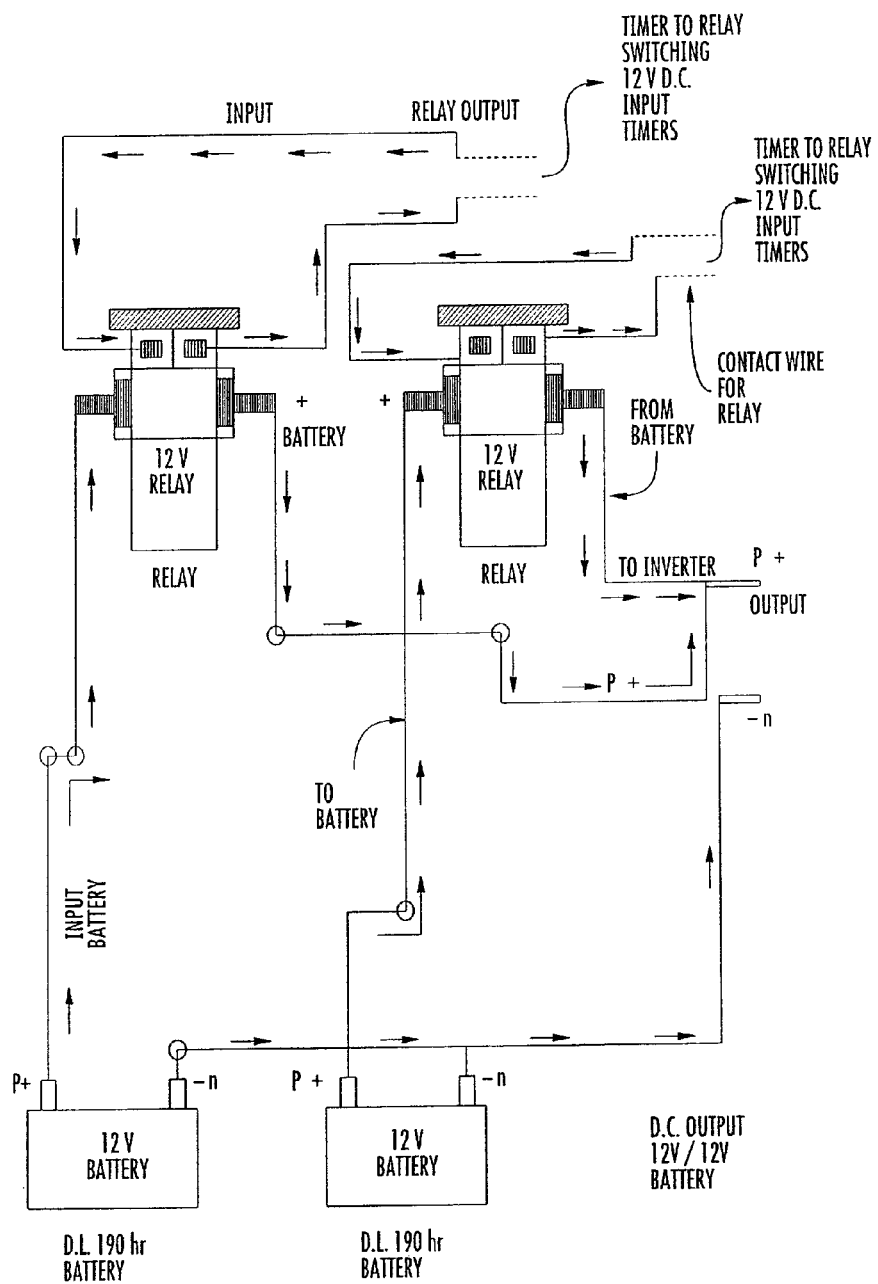
FIG. 3 is a schematic of the switching circuit of the charging device.

FIG. 3 is a detailed schematic of the switching relays 24 and 25. The batteries 30 and 31 are also illustrated in FIG. 3.

FIG. 4 is a detailed schematic of the timer circuit. An integrated circuit controls the timing within the timer circuit. The integrated circuit can contain an algorithm which controls the timer circuit.

Figure 5A:
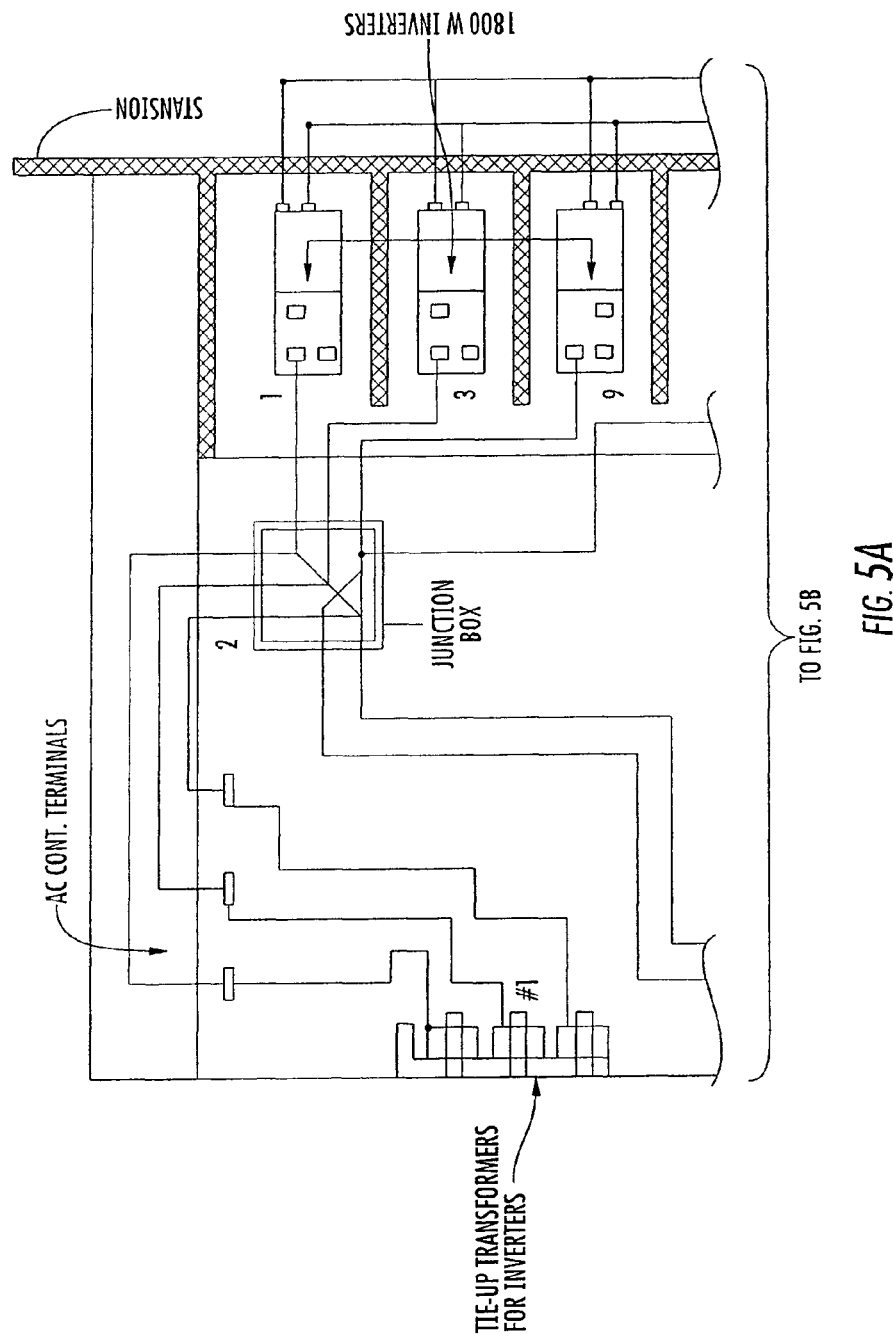
FIGS. 5A and 5B are a schematic of a portion of the system illustrated in FIGS. 1A and 1B.
Figure 5B:
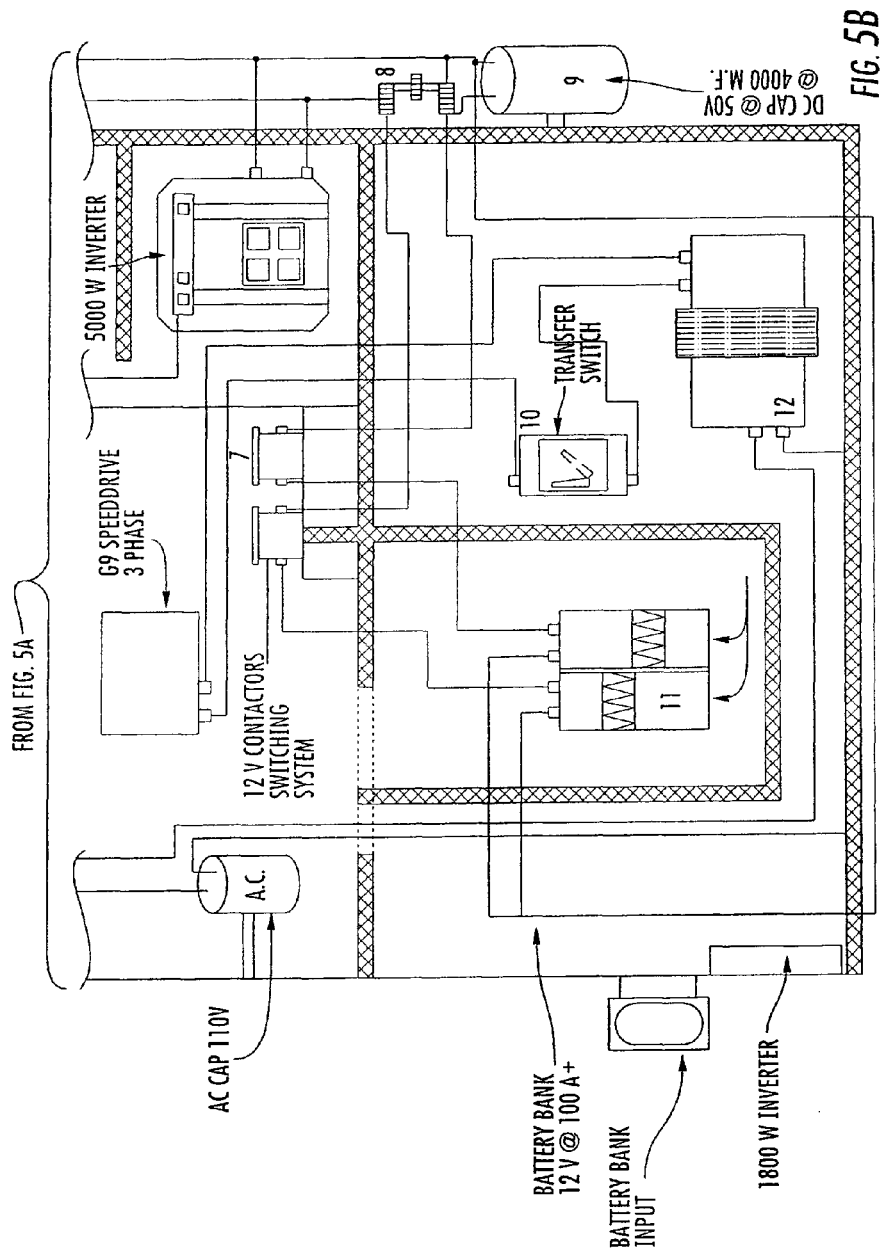

FIGS. 5A and 5B are a schematic which illustrates a portion of the electrical power system of FIGS. 1A and 1B including the inverters 1, 3, 9 and 13, the tie-up transformers the variable speed drive, and the battery bank input.

Figure 6:
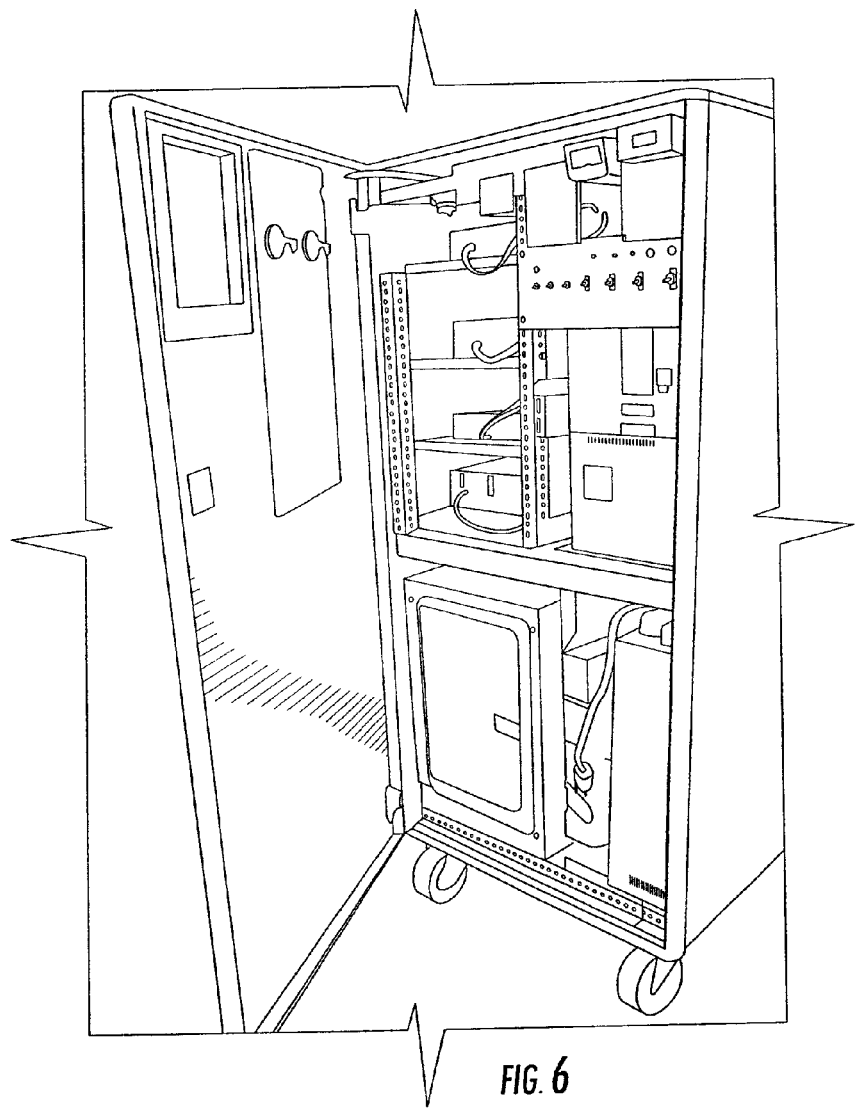
FIG. 6 is the battery charging and electrical producing system illustrated by the schematic of FIG. 1.

FIG. 6 is a front view of the present invention installed in a housing. The solar panels and/or solar arrays are not illustrated.

Figure 7:
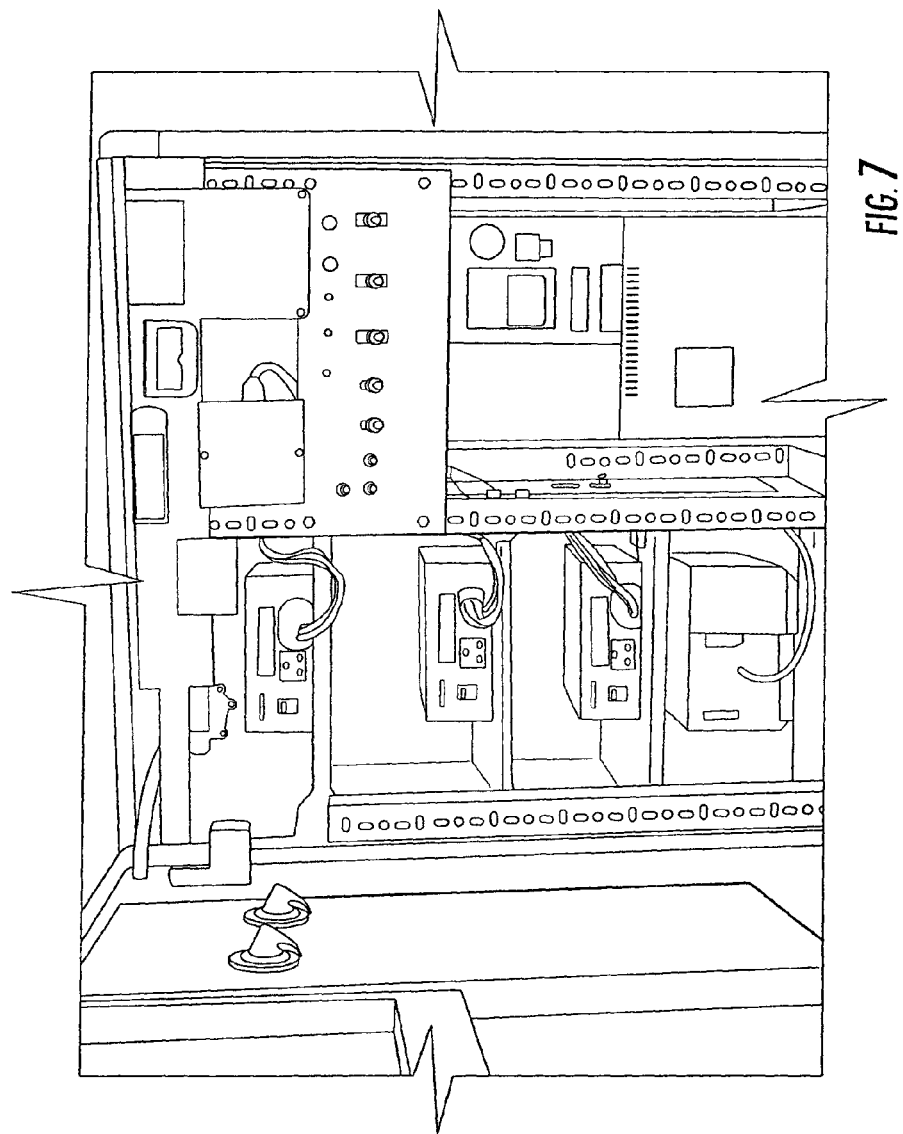
FIG. 7 is a view of the upper portion of the system illustrated in FIG. 6.

FIG. 7 is a view of the components of the electrical system of FIG. 6 in the upper portion of the housing.

FIG. 8 is a view of the components of the electrical system of FIG. 6 in the lower portion of the housing.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An apparatus for producing electrical power comprising: at least one solar panel, said at least one solar panel electrically connected to at least one input battery for supplying electrical charge to said at least one input battery in the form of direct current, said at least one input battery electrically connected to an inverter for converting direct current from said at least one input battery into alternating current, said inverter electrically connected to a transformer, said transformer having a direct current output, said transformer electrically connected to a switching relay, said switching relay having at least two outputs for passage of said direct current output from said transformer, a first of said at least two outputs electrically connected to at least one first battery, a second of said at least two outputs electrically connected to at least one second battery, said switching relay including a timing circuit whereby said switching relay alternates between providing electrical power from said at least one input battery to said at least one first battery and said at least one second battery to increase the charge of said at least one first battery and said at least one second battery, at least one output inverter in alternating electrical connection with said at least one first battery and said at least one second battery, whereby a substantially constant single phase alternating current output is provided for operation of an external electrical device.

2. The apparatus for producing electrical power of claim 1 including a solar regulator, said solar regulator in electrical connection with said at least one solar panel and said at least one input battery for conditioning power generated by said at least one solar panel for input into said at least one input battery.

3. The apparatus for producing electrical power of claim 1 including a variable speed drive, said variable speed drive having a variable speed drive input and a variable speed drive output, said variable speed drive input in electrical connection with said single phase alternating current output, said variable speed drive output providing a selectable frequency electrical alternating current output for operation of an external electrical device.

4. The apparatus for producing electrical power of claim 3 wherein said variable speed drive is constructed and arranged to provide a three phase alternating current for operation of said external electrical device.

5. The apparatus for producing electrical power of claim 1 wherein said timing circuit is variable, whereby the time that each said first and second batteries receive electrical power from said at least one input battery is adjustable.

6. The apparatus for producing electrical power of claim 1 wherein said single phase alternating current output is electrically connected to an electrical motor, said electrical motor being constructed and arranged to rotate an alternator, said alternator providing a direct current output for operation of said external electrical device.

7. A method of producing electrical power comprising:
providing at least one solar panel,
providing at least one input battery, said at least one solar panel electrically connected to said at least one input battery for supplying electrical charge to said at least one input battery in the form of direct current thereto,
providing an inverter, said at least one input battery electrically connected to said inverter for converting direct current from said at least one input battery into alternating current, providing a transformer, said inverter electrically connected to said transformer, said transformer having a direct current output, providing a switching relay, said transformer electrically connected to said switching relay, said switching relay having at least two outputs for passage of said direct current output from said transformer, providing at least one first battery, a first of said at least two outputs electrically connected to at least one first battery for providing electrical charge thereto, providing at least one second battery, a second of said at least two outputs electrically connected to at least one second battery for providing electrical charge thereto, providing a switching relay, said switching relay including a timing circuit whereby said switching relay alternates between providing electrical power from said at least one input battery to said at least one first battery and said at least one second battery, providing at least one output inverter in alternating electrical connection with said at least one first input battery and at least one second input battery, whereby a substantially constant single phase alternating current output is provided for operation of an external electrical device.

8. The method for producing electrical power of claim 7 including the step of providing a solar regulator, said solar regulator in electrical connection with said at least one solar panel and said at least one input battery for conditioning power generated by said at least one solar panel for input into said at least one input battery.

9. The method for producing electrical power of claim 7 including the step of providing a variable speed drive, said variable speed drive having a variable speed drive input and a variable speed drive output, said variable speed drive input in electrical connection with said single phase alternating current output, said variable speed drive output providing a selectable frequency electrical alternating current output for operation of said external electrical device.

10. The method for producing electrical power of claim 9 wherein said variable speed drive is constructed and arranged to provide a three phase alternating current for operation of said external electrical device.

11. The method for producing electrical power of claim 7 including the step of providing a timing circuit, whereby the time that each said first and second batteries receive electrical power from said at least one input battery is adjustable.

12. The apparatus for producing electrical power of claim 7 wherein said single phase alternating current output is electrically connected to an electrical motor, said electrical motor being constructed and arranged to rotate an alternator, said alternator providing a direct current output for operation of said external electrical device.

\* \* \* \* \*